Patented May 4, 1926.

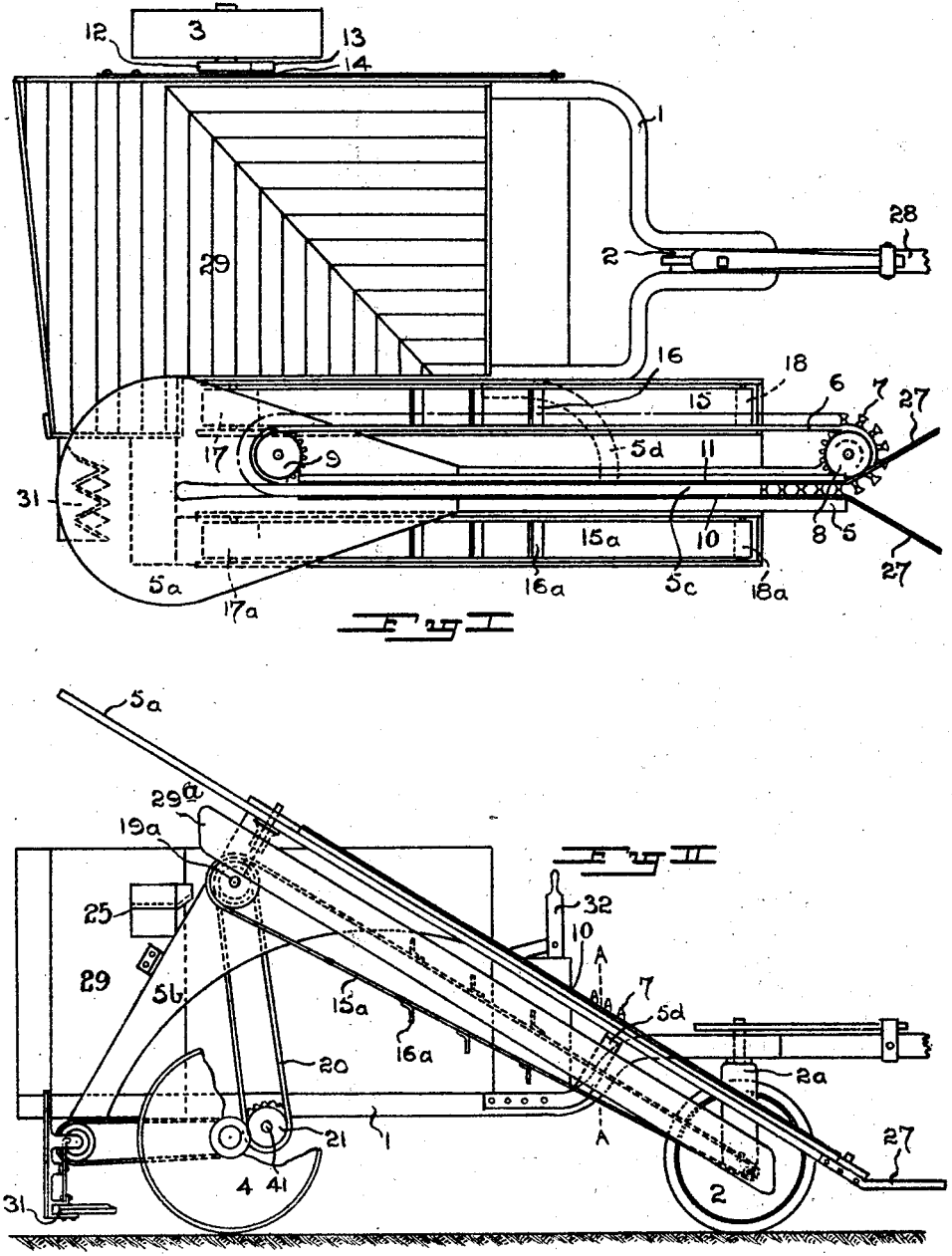

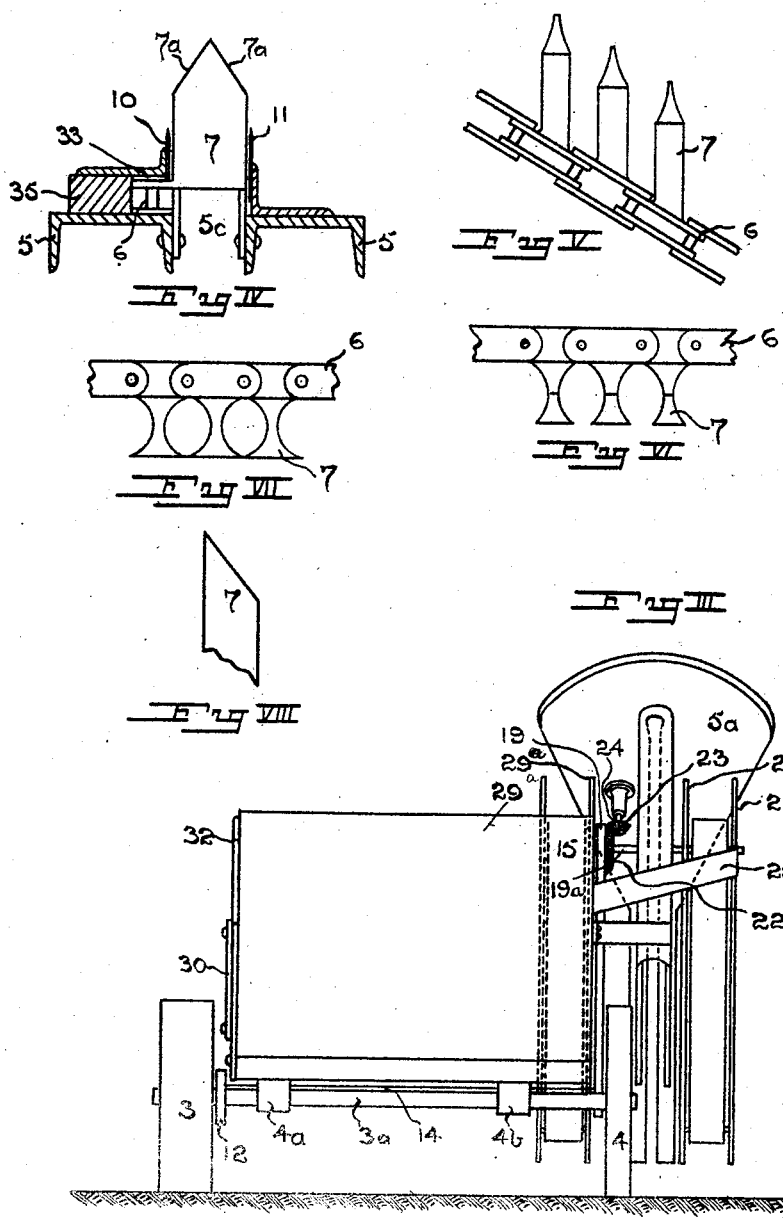

1,583,751

UNITED STATES PATENT OFFICE.

PERCY TYLER WOODLAND, OF DURBAN, NATAL, SOUTH AFRICA.

HARVESTING MACHINE.

Application filed May 1, 1923. Serial No. 636,020.

*To all whom it may concern:*

Be it known that I, PERCY TYLER WOODLAND, subject of the King of Great Britain, residing at "Orrisdale," Florida Road, Durban, Natal, South Africa, have invented certain new and useful Improvements in Harvesting Machines, of which the following is a specification, reference being had therein to the accompanying drawing.

This invention relates to machines for harvesting maize and the like and its main object is to provide a machine which will remove the cobs or ears from the stalks while the latter are in their normal growing position.

A further object is to remove the husks, such as the sheaths which surround a cob of maize, during the operation of severing the cobs from their stalks.

A further object is to collect the cobs and to deliver them from the machine at any desired spot without stopping the machine.

According to this invention an endless chain having projecting fingers working in conjunction with cutting means is mounted on a framework set at an angle with the horizontal so that the lower part of the chain is below the bottom of the cobs of the lowest growing stalks and the upper part is above the level of the cobs on the tallest stalks in a normal field.

The cobs are forced by the fingers on the chain over the cutting means whereby the cobs are severed from the stalks as close to the butts of the cobs as possible.

Conveyor belts are provided on which the severed cobs fall and are so arranged as to discharge them into a receptacle having an opening on the side farther from the row which opening is normally closed by a door. The said door can be opened when the machine arrives at the end of a row or when desired by means of a lever or the like when the cobs in the receptacle are delivered onto the ground.

The invention is more particularly described with reference to the accompanying drawings in which—

Fig. I shows a plan of the machine.
Fig. II shows a side elevation.
Fig. III shows an end view.
Fig. IV shows a sectional view on A—A of Fig. II, the chain, fingers, cutting means and U frame only being shown.
Fig. V shows a detail side view of a part of the chain.
Fig. VI shows a detail plan of a part of the chain.
Fig. VII shows a plan view of part of a chain fitted with an alternative form of fingers.
Fig. VIII shows a front view of one of the fingers of Fig. VII.

1 is the chassis of the machine which is carried on one front wheel 2 and two rear wheels 3 and 4. The rear wheels are carried on an axle $3^a$ journalled in bearings $4^a$ and $4^b$ secured to the chassis 1 and the front wheel 2 is pivotally secured to the chassis at $2^a$. Mounted on the chassis 1 is a framework 5 which preferably consists of a length of channel iron bent on itself to a substantially U shaped form and is stiffened and supported on the chassis by stiffeners and supports $5^a$, $5^b$ and $5^d$.

The framework 5 is at an angle with the horizontal as shown in Fig. II. An endless chain 6 having fingers 7 which project upwardly and sidewardly therefrom is carried on sprockets 8 and 9 so positioned that the fingers 7 lie across the opening $5^c$ formed by the legs of the U of the framework 5 along the whole length of said framework. Extending along each side of the said opening and secured to the framework 5 are knife edge cutters 10 and 11. These cutters may have serrated edges instead of the plain knife edge shown.

A conveyor belt 15 having projections 16 is mounted on rollers 17 and 18 below and at one side of the framework 5. A similar belt $15^a$ having projections $16^a$ is mounted on rollers $18^a$ and $17^a$ below and at the other side of the framework 5. The rollers 17 and $17^a$ are fast on one shaft $19^a$.

The belts 15 and $15^a$ are driven by means of a spur wheel 12 fast on the wheel 3 said spur wheel meshing with a spur wheel 13 which drives the sprocket 21 through a shaft 14. The sprocket 21 is connected by means of a chain 20 with a sprocket 19 on the roller 17. The roller 17 has on it bevel teeth 22 meshing with a bevel wheel 23 which drives the sprocket 9 through a shaft 24 thus providing the drive for the chain 6.

The upper ends of the fingers 7 are tapered as shown in Fig. IV in order to deflect the cobs to one side or other of the opening $5^c$ in the U frame 5 so as to bring the butts of the cobs in contact with the cutters 10 or 11.

A receptacle 29 is incorporated in the machine into which the conveyor belts 15 and 15ª discharge, the belt 15ª discharging into the chute 25 and thence into the receptacle 29. The floor of the receptacle slopes and at or about the lowest point is door 30 operated by a lever 32 so that when the door is opened the contents of the receptacle will fall out onto the ground.

Referring to Fig. IV, it will be seen that the chain 6 proper runs in a groove 33 on one side of the framework 5 said groove being formed by an angle iron 34 and a packing strip 35.

The fingers 7 are preferably made with concave faces as shown clearly in Figs. VI and VII.

Guides 27 project from the lower end of the framework 5, the function of the said guides being to direct the stalks into the opening 5ᶜ formed by the legs of the framework 5 where they are engaged by the fingers 7, one object of the fingers being to draw the stalk rearwardly along the said opening.

Guides 29ª are positioned on each side of the conveyor belts 15 and 15ª to prevent the cobs falling off.

Another form of finger 7 is shown in Figs. VII and VIII.

A draw bar 28 carrying with it the wheel 2 which is pivotally attached to the chassis 1 enables the machine to be drawn by oxen or any other motive power may be used. The action of the machine will be clear from the following description.

As the machine is drawn along a row of maize the chain 6 is caused to travel upwards by means of the gearing in connection with the wheel 3 which has already been described, the fingers 7 travelling between the cutters 10 and 11. The conveyor belt 15 and 15ª are also caused to move upwards.

A stalk of maize is directed by the guides 27 into the opening between the legs of the framework 5 where it is engaged by the fingers 7 the said fingers opening as the chain passes round sprocket 8. As the chain moves upwards the fingers slide up the stalk which remains in a substantially vertical position due to the backward movement of the chain relative to the machine which neutralizes the forward movement of the machine relative to the ground.

When the fingers arrive at the base of the cob, the space between them being such as not to allow the passage of the cob though allowing the stalk to pass freely, they deflect it to one side or the other of the opening between the legs of the U frame by reason of the sloping sides 7ª of the fingers 7 and the shank at the butt of the cob is brought into contact with the knife edge 10 or 11 which cuts off the cob close to the base. Cobs which, for some reason, fail to come in contact with the knives 10 or 11 are forced off the stalks by the chain fingers 7. The leaf sheaths growing at the base are severed and fall with the cobs and may if desired be fanned away and those leaf sheaths which have their point of attachment lower down the stalk remain thereon.

The cob either falls on the conveyor belt 15 or else onto the conveyor belt 15ª and is delivered into the receptacle 29 direct by conveyor 15 or via the chute 25 by conveyor 15ª.

In the case where there is only one slope on the fingers 7 as shown in Fig. VIII the conveyor belt 15ª and chute 25 can be dispensed with as also can one of the cutters 10 or 11. The cobs will all then be deflected to one side of the chain.

Mechanism for cutting the stalks may also be incorporated in the machine as indicated at 31.

The machine may be utilized to pick more than one row at a time by providing more than one set of picking mechanism and although its operation has been described more particularly with reference to maize it is only a matter of altering the design of the fingers 7 to adapt it for picking kafir corn and other crops.

I claim:

1. In a corn harvester, a wheeled frame, an inclined frame having a longitudinal passage into which the stalks pass as the machine travels forwardly, an upwardly extending longitudinal fixed blade at one side of the passage of the inclined frame, and an endless traveling belt at one side of the said passage and provided with fingers extending over the said passage and projecting above the cutting blade, the fingers having concave faces and beveled ends and cooperating with the cutting blades to sever the ears from the stalks.

2. A corn harvester comprising a wheeled frame, an inclined frame on the wheeled frame and having a longitudinal passage, means for guiding the stalks into the passage, upwardly extending longitudinal fixed blades at the sides of the passages of the inclined frame, an endless belt at one side of the passage of the inclined frame and having fingers extending over the said passage and projecting above the cutting blades, the fingers having their ends beveled from the center outwardly, a receptacle on the wheeled frame, a conveyor at each side of the inclined frame and discharging into the receptacle, and means for operating the belt and carriers from the wheeled frame.

3. A corn harvester, comprising a wheeled frame, a receptacle on the frame, an upwardly and rearwardly inclined frame on the wheeled frame and having a longitudinal passage, means for guiding the stalks into the passage, a longitudinal upwardly projecting fixed blade at each side of the passage, an endless belt mounted on the inclined frame at one side of the passage thereof and provided with fingers projecting over the passage and above the blades, the fingers having concave faces and ends beveled from the center outwardly, an endless conveyor at each side of the inclined frame and in a lower plane than the belt and delivering into the receptacle, and means for operating the belt and carriers from the wheeled frame.

4. In a corn harvester, a wheeled frame, an inclined open-ended frame formed of angle iron mounted on the wheeled frame with its open end forward, angle irons carried by the members of the frame, one of said irons being spaced therefrom to form therewith a longitudinal groove, guides on the ends of the members of the frame, a longitudinal blade secured to each angle iron, an endless belt mounted in said groove and provided with fingers extending between the members of the said frame and above the blades, and means for operating the belt.

In testimony whereof I affix my signature.

PERCY TYLER WOODLAND.